United States Patent [19]
Liebhart

[11] Patent Number: 5,441,678
[45] Date of Patent: Aug. 15, 1995

[54] METHOD FOR REMOVING DENTS FROM PLASTIC BOTTLES

[75] Inventor: Dana J. Liebhart, Cuyahoga Falls, Ohio

[73] Assignee: Automated Label Systems Company, Twinsburg, Ohio

[21] Appl. No.: 129,657

[22] Filed: Sep. 30, 1993

[51] Int. Cl.⁶ .................. B32B 35/00; B28B 1/02
[52] U.S. Cl. ..................... 264/36; 264/310; 264/320
[58] Field of Search ............ 264/36, 310, 320; 425/11, 402

[56] References Cited

U.S. PATENT DOCUMENTS

| | | | |
|---|---|---|---|
| 2,414,776 | 1/1947 | Stephenson et al. | 425/402 X |
| 3,268,634 | 8/1966 | Glaser | 264/36 |
| 3,389,193 | 6/1968 | Nughes | 264/310 X |
| 3,635,610 | 1/1972 | Hall et al. | 264/36 X |
| 3,865,527 | 2/1975 | McGehee | 264/36 X |
| 4,209,540 | 6/1980 | Jones, Jr. | 264/310 X |

*Primary Examiner*—Christopher A. Fiorilla
*Attorney, Agent, or Firm*—Watts, Hoffmann, Fisher & Heinke Co.

[57] ABSTRACT

A method for reshaping objects such as plastic bottles to re-establish round conditions after damage whereinin line bottles are conveyed along a path of travel between opposing, parallel, planar surfaces which are spaced a distance equal to the diameter of the objects. One of the surfaces is a span of an endless belt which is caused to travel in the direction of bottle travel at a speed which will cause the bottles to rotate as they are moved along the path. Rotation of the bottles while opposed lines of contact are maintained between surfaces of the bottle and the opposed planar surfaces re-establishes the objects to round configurations.

14 Claims, 1 Drawing Sheet

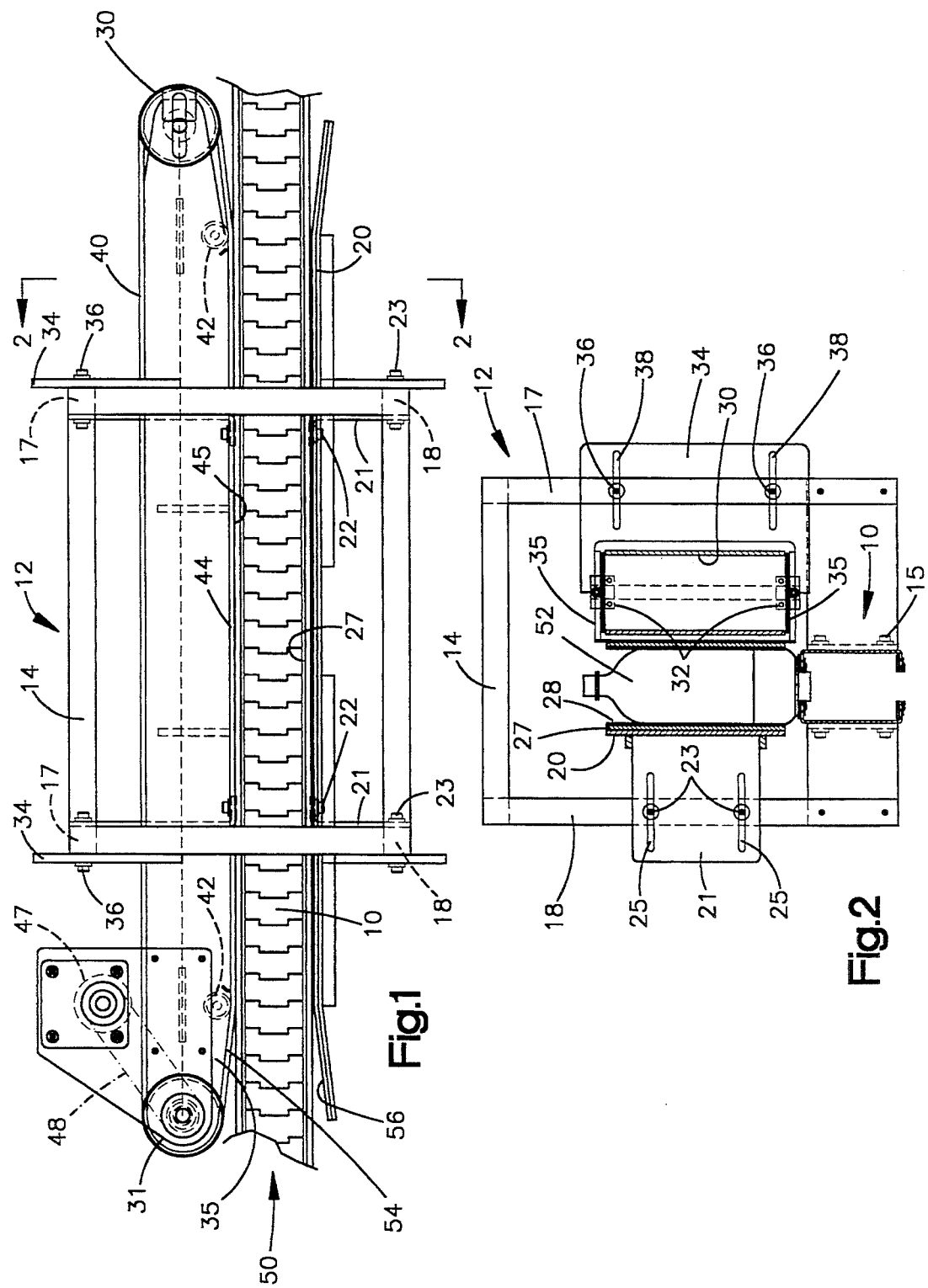

METHOD FOR REMOVING DENTS FROM PLASTIC BOTTLES

FIELD OF THE INVENTION

This invention relates to bottle handling equipment and, more particularly, to a mechanism which is especially suited for re-establishing roundness in plastic bottles which have been dented.

BACKGROUND OF THE INVENTION

In the packaging of fluids such as soft drinks, identifying labels are applied to vessels such as plastic bottles. The use of tubular plastic sleeve labels that are telescoped over a vessel is enjoying increasing popularity. Machines for applying such tubular labels to bottles or other objects such as the machines shown in U.S. Pat. No. 4,412,876 issued Nov. 1, 1983 to Bernard Lerner et al. under the title "Labeling Apparatus," and U.S. Pat. No. 4,620,888 issued Nov. 4, 1986 to William Easter et al., also entitled "Labeling Apparatus," have enjoyed commercial success. More recently, a machine described in co-pending U.S. patent application Ser. No. 07/963,059 filed Oct. 27, 1992 and entitled "High Speed Sleever" (The High Speed Labeler), has been developed for applying sleeve labels to bottles at speeds measured in the hundreds of bottles per minute and it is also enjoying commercial success.

Bottles made of a plastic known as PET are now widely used for bottling such things as soft drinks. A problem presented by these bottles is that they can be dented quite easily, and once dented, lose their original shape which is typically round in cross section. If a bottle with a relatively severe dent is fed to a labeling station, it can, and often will, cause a jam. In the past, the typical solution has been for an operator to visually observe bottles being conveyed to a labeling station and to manually remove those bottles which, through prior processing, have become misshapen to a degree where they are apt to cause a jam.

With The High Speed Labeler, visual inspection and manual removal is, at best, difficult since bottles are fed to the labeler and labeled at rates typically of the order of 500 per minute. Accordingly, the high throughput speeds have exacerbated the existing problem of misshapen bottles While the potential for machine jams with misshapen bottles has been a major part of the problem, it is not the entire problem. Where misshapen bottles have been manually observed and removed, typically no attempt has been made to salvage the bottles and make them usable. Rather, such bottles have been discarded typically to be ground up and recycled, thus adding to the cost of the bottling process.

SUMMARY OF THE INVENTION

A process according to the present invention re-establishes sufficient roundness in damaged objects such as plastic soft drink bottles to enable further processing and use. This re-establishment of the object's roundness is accomplished automatically by rotating the object about its axis while maintaining contact of an outer surface of the object against an opposing surface which is parallel to the object axis. This contact is maintained through at least one, and preferably three, revolutions of the object to return the object to sufficient roundness to enable further processing. With the preferred and disclosed embodiment, during rotation of the object, contact is made by diametrically opposed surfaces such that the object is compressed between a pair of parallel surfaces spaced a distance equal to the diameter of the object as it is advanced along a path of travel and rotated. Preferably, the opposed contact and object rotation is maintained through three revolutions of the object.

The presently preferred mechanism for performing the improved process has an elongate conveyor which transports inline bottles along a path through a bottle rounding or de-denting station. A stationary bottle engagement member is positioned along one side of the path. The stationary member has a planar surface for engaging the bottles as they traverse the path. An endless belt is mounted on the side of the path opposite the stationary member. The belt is mounted on a spaced pair of rollers, one of which is driven. The belt includes a span which is parallel to the stationary surface and spaced from it a distance equal to the original diameter of bottles to be straightened. The span is driven in the direction of bottle travel along the path to cause the bottles to rotate as they are trapped between the span and the stationary surface. The span and the surface establish diametrically opposed lines of contact with the surface of the bottle. These lines of contact orbit the surface of the rotating bottle, causing dented portions of the bottle to tend to spring back to their original configuration and restore roundness to the bottles.

The stationary member and the span are relatively adjustable toward and away from one another so that the machine in the preferred embodiment is capable of re-establishing roundness to bottles of any diameter within a predetermined bottle size range.

Accordingly, the objects of the invention are to provide a novel and improved process of re-establishing bottle roundness and a mechanism for practicing the process.

BRIEF DESCRIPTION OF T THE DRAWINGS

FIG. 1 is a plan view of the preferred embodiment of the bottle's rounding apparatus of this invention; and FIG. 2 is a sectional view of the apparatus of FIG. 1 as seen from the plane indicated by the line 2—2 of FIG. 1 and on an enlarged scale.

DESCRIPTION OF THE PREFERRED EMBODIMENT

Referring to the drawings, an elongate conveyor 10 is provided. The elongate conveyor 10 is adapted to transport bottles in a single-file row along a path through a bottle rounding apparatus shown generally at 12. The rounding apparatus 12 includes a frame 14 which is connected to the conveyor 10 as by bolts 15 (FIG. 2). The frame 14 is in the configuration of a rectangular solid, including a pair of belt side vertical elements 17 and a pair of stationary side vertical elements 18.

A stationary bottle engagement member 20 is provided. The stationary bottle engagement member 20 is connected to a pair of mounting plates 21 by bolts 22 (FIG. 1). The mounting plates 21 are, in turn, connected to the stationary side verticals 18 by bolts 23. Referring to FIG. 2, the mounting plates 21 each include a pair of vertically spaced, horizontally extending slots 25. The bolts 23 project through the slots 25 which together allow for lateral adjustment of the stationary member 20 toward and away from the path of bottle travel. The stationary member 20 includes a texturized sheet 27 delineating a stationary bottle engagement surface 28.

Spaced idler and driven rollers 30, 31 are provided. The rollers are mounted on the side of the path of travel opposite the stationary member 20. The rollers are journaled for rotation about spaced vertical axes by bearings 32 (FIG. 2) carried by horizontal support 35. Spaced roller mounting plates 34 are connected to the horizontal supports 34. The mounting plates 34 are respectively connected to the belt side verticals 17 as by bolts 36. The mounting plates 34, like the mounting plates 21, have elongate horizontally disposed slots 38, permitting lateral adjustment of the rollers 30, 31 toward and away from the conveyor 10.

An endless belt 40 is wrapped around and carried by the rollers 30, 31. A pair of idler rollers 42 are interposed between and offset toward the path from the rollers 30, 31. The idler rollers 42 delineate a belt span 44 which is parallel to and spaced from the stationary member 20. A surface 45 of the span 44 cooperates with the stationary surface 28 to delineate the boundaries of a bottling-straightening space along the path of travel. The belt 40, like the sheet 27, is of a texturized material for frictional engagement with a bottle to be straightened. Preferably, the surfaces of the sheet 27 and the belt 40 are made of soft gum rubber.

A prime mover in the form of an electric motor 47 is drivingly connected to the driven roll 31 by a belt 48 (FIG. 1). Assuming the conveyor 10 is traveling from left to right as viewed in FIG. 1 and indicated by an arrow 50, the motor 47 is operated to drive the span 44 in the same direction at a speed which will cause bottle rotation between the surfaces 27, 45 which are opposing, bottle straightening or rounding surfaces that engage bottles along diametrically opposed lines of contact.

Operation

In operation, an inline set of bottles 52 are conveyed from left to right as viewed in FIG. 1 along the path of travel indicated by the arrow 50.

Co-action of a canted span 54 of the belt 40 and a tapered inlet segment 56 of the stationary member 20 guide the bottles into registration between the surfaces 27, 45. The stationary member and the rollers will have been adjusted in advance such that the space between the surfaces 27, 45 is equal to the diameter of the bottles being processed in their original as formed and round conditions.

As the bottles 52 advance between the surfaces 27, 45, rotation of the driver roll 31 causes the belt span 44 to advance at a speed which will cause the bottles between the surfaces to rotate about their respective axes. As the bottles rotate, diametrically opposed lines of contact are maintained between the surfaces 27, 45 and outer surfaces of the bottles 52. This rotation of the bottles is maintained such that the lines of contact between the bottle surfaces and the straightening surfaces 27, 45 will orbit at least one circumferential revolution. Preferably, the longitudinal lengths of the surfaces 27, 45 are sufficient to cause each bottle to make three complete revolutions as the bottle traverses the space between the straightening surfaces.

The perimetral opposed contact of the straightening surfaces 27, 45 with the bottles as they rotate causes the bottles to return substantially to their original round condition and substantially, if not completely, removes any dents from the bottles so that they have achieved a roundness suitable for further process such as in The High Speed Labeler.

The present invention has been described with a degree of particularity, but it is the intent that the invention include all modifications from the disclosed preferred design falling within the spirit or scope of the appended claims.

I claim:

1. A method of assuring sufficient roundness of a plastic bottle to enable automatic label application comprising:
    a) rotating the plastic bottle about an axis thereof while maintaining substantially line contact of an outer surface of the bottle against an opposing generally planar and stationary surface which is parallel to the axis of rotation;
    b) relatively moving the axis of rotation and the opposing surface while the bottle rotates and the distance between the axis of rotation and the line contact is maintained substantially constant; and
    c) continuing the relative motion and bottle rotation while maintaining surface contact for at least one revolution of the bottle to apply dent modifying pressure thereby effecting rounding of the bottle and a reduction in severity of dents in the bottle.

2. The method of claim 1 wherein surface contact, relative motion and bottle rotation are maintained for three revolutions of the bottle.

3. The method of claim 1 wherein a second surface engages the bottle outer surface at a location diametrically opposite the line contact and the opposing and second surfaces are relatively moved while the contact and engagement are maintained to effect bottle rotation.

4. A method of at least partially removing dents from at least one plastic bottle having a longitudinal axis and a circular cross section comprising:
    a) establishing spaced lines of engagement between each one of a plurality of straightening members and an outer surface of said at least one bottle with each of the lines of engagement generally paralleling the axis; and
    b) relatively moving the at least one bottle and the members to cause the lines of engagement to orbit the at least one bottle while applying dent modifying pressure to the at least one bottle an thereby at least partially relieving dents in the at least one bottle.

5. The method of claim 4 wherein each of the straightening members has a planar surface and the respective lines of engagement.

6. The process of claim 5 wherein the at least one bottle is rotated through a plurality of circumferential traversals of the lines of engagement.

7. The process of claim 6 wherein the at least one bottle rotation is continued through three such circumferential rotations.

8. A process of reestablishing circular configurations to plastic bottles which were initially circular but have been dented and thereby distorted to an out-of-round condition comprising:
    a) conveying an in-line set of bottles along a linear path of travel;
    b) as the bottles are being conveyed compressing the bottles between a spaced pair of generally planar surfaces disposed on opposite sides of the path while establishing spaced lines of engagement between outer surfaces of the bottles; and c) moving one of the planar surfaces in the direction of bottle travel to cause the bottles to rotate each through at least one circumferential traversal of each such line of engagement and thereby at least partially removing such dents.

9. The process of claim 8 wherein the bottles are rotated through a plurality of circumferential traversals of the lines of engagement.

10. The process of claim 9 wherein the bottle rotation is continued through three such circumferential rotations.

11. A process of at least partially removing dents from a set of round, plastic bottles of like original configuration to facilitate further processing of the bottles comprising:

a) adjusting spacing between a planar surface and a surface of a parallel span of a belt conveyor to a spacing equal to the original diameter of the bottles;

b) aligning the bottles single file in an elongate row;

c) transporting the bottles along a path of travel while aligned in the row between and in engagement with the surfaces at a first speed; and d) moving the span surface in a direction paralleling the path at a second speed different than the first speed to cause the bottles to rotate while applying dent modifying pressure to thereby at least partially remove dents from dented ones of the bottles.

12. The process of claim 11 wherein the span surface movement parallels the direction of bottle travel.

13. The process of claim 12 wherein the second speed is faster than the first speed.

14. The process of claim 11 wherein the second speed is faster than the first speed.

* * * * *